United States Patent [19]

Noda et al.

[11] Patent Number: 4,464,489

[45] Date of Patent: Aug. 7, 1984

[54] METHOD FOR THE PRODUCTION OF POLYIMIDE POWDER

[75] Inventors: Yuzuru Noda; Toshio Nakajima, both of Osaka, Japan

[73] Assignee: Nitto Electric Industrial Co., Ltd., Osaka, Japan

[21] Appl. No.: 560,304

[22] Filed: Dec. 12, 1983

[30] Foreign Application Priority Data

Dec. 11, 1982 [JP] Japan ................. 57-217619

[51] Int. Cl.³ .................................... C08J 9/02
[52] U.S. Cl. .................................... 521/117; 521/157; 521/160; 521/183; 521/56; 528/73; 528/182; 528/228; 528/353
[58] Field of Search ............... 521/157, 160, 183, 117, 521/56; 528/73, 182, 228, 353

[56] References Cited

U.S. PATENT DOCUMENTS 3,300,420 1/1967 Frey ..................................... 521/157
4,263,410 4/1981 Tung et al. ........................ 521/157

Primary Examiner—Morton Foelak
Attorney, Agent, or Firm—Sughrue, Mion, Zinn, Macpeak and Seas

[57] ABSTRACT

Spherical porous polyimide powder having an average particle diameter of 1 to 20 μm which is infusible and insoluble in organic solvents is produced by polymerizing an aromatic tetracarboxylic acid dianhydride and an aromatic polyisocyanate in an organic solvent at a temperature of 100° to 200° C. and in the presence of a tertiary amine catalyst to form polyimide particles in the form of slurry, filtering or centrifuging said polyimide particles, and washing the resulting polyimide particles with an organic solvent.

8 Claims, 6 Drawing Figures

METHOD FOR THE PRODUCTION OF POLYIMIDE POWDER

FIELD OF THE INVENTION

The present invention relates to a process for the production of polyimide power, wherein said powder is infusible and insoluble in organic solvents.

BACKGROUND OF THE INVENTION

Polyimide powder has been produced by (1) polymerizing a corresponding tetracarboxylic acid dianhydride and a diamine in an organic solvent under heating to prepare a solution of a polyamide acid which is a precursor of polyimide; (2) introducing this solution into a solvent such as water which does not solubilize the polymer; (3) collecting the resulting precipitate; (4) heating the precipitate for ring closure to form a polyimide; and (5) mechanically crushing the polyimide.

Polyimide powder has also been prepared by (1) polymerizing, under heating, a corresponding tetracarboxylic acid dianhydride and a diamine in a solvent such as ethylene glycol which does not solubilize the polymer to form a slurry of polyamide acid; (2) filtering out the polyamide acid from the slurry; (3) heating the filtered polyamide acid for ring closure to form a polyimide; and (4) crushing the polyimide.

In the above processes, polyamide acid, which is a precursor of polyimide, is prepared first and then the polyamide acid is turned into polyimide through ring closure with heating and the resulting polyimide is crushed into fine particles. These steps are employed because the direct polymerization of a tetracarboxylic acid dianhydride and a diamine does not proceed smoothly due to the formation of gel-like polymide which cannot be easily discharged and crushed.

The above-described processes are industrially disadvantageous because complex processing steps are required, the resulting powder tends to be coarse, and a special pulverizing technique is required for producing fine particles.

A process for producing polyimide powder which is fusible (or thermoplastic) and sometimes soluble in organic solvents has been developed. In this process, the polymerization reaction is carried out in a polar solvent for 3, 3′, 4, 4′-benzophenonetetracarboxylic acid dianhydride and a diisocyanate mixture of tolylene diisocyanate and diphenylmethane-4, 4′-diisocyanate, to directly form a slurry or solution of polyimide. The slurry or solution of polyimide is then introduced into a solvent such as acetone or isopropyl alcohol for precipitation. The precipitate is then filtered out and crushed.

If the diisocyanate mixture in the above process described contains less than 70 mol % tolylene diisocyanate, the polymerization reaction forms the polyimide in the form of slurry. Further, if the diisocyanate mixture contains more than 70 mol % tolylene diisocyanate, the polymerization reaction forms the polyimide in the form of solution.

The above-described process is intended to prevent the formation of a gel and to produce polyimide directly by replacing the diamine component with the diisocyanate component. It is simpler than the process of forming polyamide acid and then turning it into a polyimide through ring closure with heating.

However, the above-described process, is essentially the same as the conventional process for preparing infusible and insoluble polyimide powder because it employs the indispensable steps of preparing a slurry or solution of polyimide, introducing the slurry or solution into a solvent which does not solubilize the polymer such as acetone or isopropyl alcohol, filtering the precipitate, and drying and crushing the precipitate. Moreover, such a process does not readily provide polyimide powder of fine particles.

SUMMARY OF THE INVENTION

Accordingly, an object of the present invention is to provide a process for producing fine spherical porous polyimide powder which is infusible and insoluble in organic solvents.

Another object of the present invention is to provide a process for producing fine spherical porous polyimide powder without employing complex processing steps.

The above-described objects have been met by the process comprising:

(1) polymerizing at least one aromatic tetracarboxylic acid dianhydride which forms an infusible insoluble polyimide and an approximately the same quantity of at least one aromatic polyisocyanate in an organic solvent at a temperature of 100° to 200° C. and in the presence of a tertiary amine catalyst to form said polyimide particles in the form of slurry;

(2) filtering or centrifuging said polyimide particles; and;

(3) washing the resulting polyimide particles with an organic solvent, wherein the resulting polyimide powder has an average particle diameter of 1 to 20 μm.

DETAILED DESCRIPTION OF THE INVENTION

Figure 1:
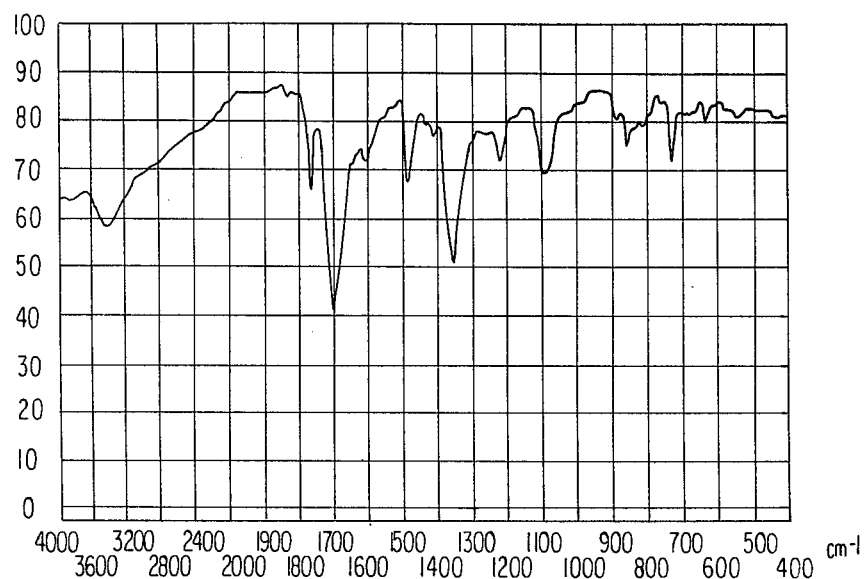
FIGS. 1 to 3 are infrared absorption spectrums of polyimide powder produced according to the process of the present invention.

As stated above, the present invention relates to a process for preparing polyimide powder comprising:

(1) polymerizing at least one aromatic tetracarboxylic acid dianhydride which forms an infusible insoluble polyimide and an approximately the same quantity of at least one aromatic polyisocyanate in an organic solvent at a temperature of 100° to 200° C. and in the presence of a tertiary amine catalyst to form said polyimide particles in the form of slurry;

(2) filtering or centrifuging said polyimide particles; and (3) washing the resulting polyimide particles with an organic solvent, wherein the resulting polyimide powder has an average particle diameter of 1 to 20 μm.

In the process of the present invention it is unnecessary to precipitate and filter polyamide acid and turn it into polyimide through ring closure with heating, nor pulverize the resulting polyimide. Moreover, the process of the present invention does not require introducing the polyimide slurry into a solvent which does not solubilize the polyimide powder.

Polyisocyanate is employed in the present invention instead of the conventionally employed diamine so as to prevent the formation of a gel during polymerization.

In the above-discussed conventional process for producing thermoplastic polyimide powder, the polyimide slurry is formed at a polymerization temperature near room temperature. Therefore, the resulting polyimide particles cannot be readily filtered out or centrifuged from the slurry. This makes it necessary to introduce the slurry into acetone to separate the polyimide particles.

According to the process of the present invention, polyimide powder is formed in an organic solvent and it is simply filtered out or centrifuged and washed to become the final product.

The polyimide powder produced according to the process of the present invention has an average particle diameter of 1 to 20 μm, which is much finer than that of the polyimide powder produced according to the conventional process. The fact that the polyimide powder of such fine particles can be prepared without using the pulverizing step after the first and second steps is another advantage of the present invention.

In addition, the infusible insoluble polyimide powder produced according to the conventional process and the thermoplastic polyimide powder produced according to the above-described process are not of spherical structure because they are produced by mechanically pulverizing the lumpy polyimide nor do they have a fluffy porous structure.

The infusible insoluble polyimide powder having a spherical porous structure produced according to the process of the present invention is useful as an additive for a variety of resin molding materials. Moreover, it is useful as a thixotropic agent for a variety of varnishes. When used for these purposes, the polyimide powder of the present invention disperses well into the matrix and greatly improves the thixotropic properties because it is in the form of infusible insoluble fine particles having a spherical porous structure, that is, the spherical porous structure helps improve the adhesion to binders.

The aromatic tetracarboxylic acid dianhydride and the aromatic polyisocyanate used in the present invention may be properly selected so long as they form, through polymerization reaction, a polyimide which (1) does not melt at a temperature up to 500° C., (2) decomposes without melting when heated above 500° C., and (3) does not dissolve in polar solvents and other solvents.

The formation of an infusible insoluble polyimide is determined by either the aromatic polyisocyanate, or by the combination of both. The combination of 3,4,4',4'-benzophenonetetracarboxylic acid dianhydride and a mixture of tolyene diisocyanate and diphenylmethane-4,4'-diisocyanate as used in the above-described process is excluded in the present invention because such provides a polyimide powder which is thermoplastic or soluble in organic solvents.

Examples of the aromatic tetracarboxylic acid dianhydride useful in the present invention include:
pyromellitic acid dianhydride,
3,3',4,4'-benzophenonetetracarboxylic acid dianhydride,
3,3',4,4'-biphenyltetracarboxylic acid dianhydride,
2,3,3',4'-biphenyltetracarboxylic acid dianhydride,
2,3,6,7-naphthalenetetracarboxylic acid dianhydride,
1,2,5,6-naphthalenetetracarboxylic acid dianhydride,
1,4,5,8-naphthalenetetracarboxylic acid dianhydride,
2,2'-bis(3,4-dicarboxyphenyl)propane dianhydride,
bis-(3,4-dicarboxyphenyl) sulfonic acid dianhydride,
bis-(3,4-dicarboxyphenyl) ether dianhydride,
2,2'-bis(2,3-dicarboxyphenyl) propane dianhydride,
1,1'-bis (2,3-dicarboxyphenyl) ethane dianhydride,
benzene-1,2,3,4-tetracarboxylic acid dianhydride,
2,3,6,7-anthracenetetracarboxylic acid dianyhydride, and
1,2,7,8-phenanthrenetetracarboxylic acid dianhydride.

Examples of the aromatic polyisocyanate useful in the present invention include:
p-phenylene diisocyanate,
m-phenylene diisocyanate,
diphenylmethane-4,4'-diisocyanate,
diphenylether-4,4'-diisocyanate,
diphenylpropane-4,4'-diisocyanate,
diphenylsulfone-4,4'-diisocyanate,
diphenylsulfone-3,3'-diisocyanate,
diphenyl-4,4'-diisocyanate,
3,3'-dimethyldiphenyl-4,4'-diisocyanate,
2,4-tolylene diisocyanate,
naphthalene-2,6-diisocyanate, and
2,5-tolylene diisocyanate.

In addition, polyisocyanates containing isocyanurate rings represented by the following formula are useful in the present invention:

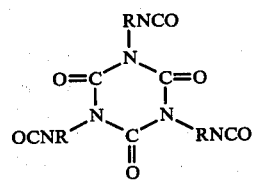

These polyisocyanates are synthesized from diphenylmethane-4,4'-diisocyanate, tolylene diisocyanate, or xylene diisocyanate, and a poly(methylenephenylene) polyisocyanate such as triphenylmethane-triisocyanate represented by the following formula:

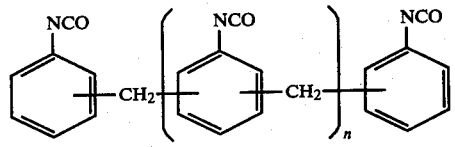

wherein n is an integer of 1 to 4.

In the case of using the polyisocyanates, if those are used in a large amount, gelation occurs. Therefore, polyisocyanates are used in an amount up to 30 mole %.

One or more of the aromatic tetracarboxylic acid dianhydrides and one or more of the aromatic polyisocyanate can be used in combination. The aromatic tetracarboxylic acid dianhydride and aromatic polyisocyanate should be used in equivalent moles, although a slight excess of either component is permissible.

The polymerization reaction of the aromatic tetracarboxylic acid dianhydride and the aromatic polyisocyanate may be accelerated by adding a catalyst such as a tertiary amine. Examples of such tertiary amine include triethylamine, tri-n-butylamine, 1,8-diazabicyclo-(5,4,0)-undecene-7 and a complex thereof, dimethylbutylamine, N,N-dimethyl-p-toluidine, N,N-dimethylaniline and N,N-dimethylbenzylaniline. The catalyst is used in an amount of 0.05 to 10 mole % per 1 mole of aromatic tetracarboxylic acid dianhydride employed.

Examples of the organic solvent used for the polymerization reaction include N-methyl-2-pyrrolidone, N,N-dimethylacetamide, N,N-dimethylformamide, dimethylsulfoxide, hexamethylphosphortriamide, N,N'-dimethyl-2-imidazolidinone and other polar solvents, and cresol, phenol, xylenol, and other phenols. These solvents may be used in combination with an organic solvent such as hexane, benzene, toluene, and xylene.

The organic solvent should be used in such an amount that the concentration of the aromatic tetracarboxylic acid dianhydride and aromatic polyisocyanate is 5 to 80 wt%, and preferably 10 to 30 wt%, on a solid basis. If the concentration is excessively low, the reaction rate is slow. If the concentration is excessively high, it is difficult to control the exothermic reaction.

The polymerization reaction is carried out by adding the aromatic tetracarboxylic acid dianhydride, aromatic polyisocyanate, and tertiary amine catalyst to an organic solvent, with heating and stirring. In this step, the components dissolve in the solvent to form a uniform solution. As the polymerization reaction proceeds, the solution becomes viscous, and carbon dioxide gas is liberated. Then, polyimide particles separate out and precipitate in the form of slurry. The reaction is continued with heating and stirring for improved yields.

The polymerization reaction temperature should be 100° to 200° C. If it is lower than 100° C., the reaction rate is low and the resulting polyimide particles are excessively small in size. Thus, the reaction system becomes too thixotropic to be easily stirred. Moreover, such fine particles cannot be filtered out or centrifuged. As the reaction temperature becomes high, the reaction rate increases; but excessively high reaction rates tend to provide a polyimide powder containing large particles. Therefore, the upper limit should be 200° C. The most preferred temperature is 110° to 180° C.

The reaction time is preferably 1 to 8 hours depending on the components used and the presence or absence of catalyst.

In step (2) of the process of the present invention the polyimide particles are filtered out or centrifuged from the slurry formed in step (1). A common filter or centrifuge is used in this step. The separated polyimide particles carry a small quantity of unreacted products and low-molecular weight polymers, which cause blocking of particles in the heating and drying steps, making the particles coarse.

In step (3) of the present invention, the polyimide particles obtained in step (2) are washed with an organic solvent to remove the undesirable products and low-molecular weight polymers. This step makes it possible to produce a polyimide powder of fine particles which is free of blocking. Thus, step (3) is very important and it differs from the common simple washing step.

Washing in the present invention is accomplished with a polar solvent such as N-methyl-2-pyrrolidone which dissolves unreacted products and low-molecular weight polymers. It is preferable to wash again with a low-boiling solvent such as acetone or methanol.

The resulting polyimide powder is then dried with heating at 100° to 300° C. for 1 to 5 hours to remove the solvent.

The resulting powder has an average particle diameter of 1 to 20 μm and has a spherical porous structure. It is characteristic in that it does not melt during baking at a high temperature and it does not dissolve in a polar solvent.

The average particle size of polyimide powder as used herein means the weight average particle size ($\bar{X}$) which corresponds to the particle size at 50 wt% in the weight cumulative distribution obtained by using a photo extinction type particle size distribution analyzer, such as Model SKN-500 made by Seishin Kigyo Co., Ltd.

The invention is now described in more detail with reference to the following examples which are in no way intended to limit the scope of the present invention.

EXAMPLE 1

Into a 300-ml four-neck flask were charged 21.8 g (0.1 mole) of pyromellitic dianhydride, 26.4 g (0.1 mole) of 3,3'-dimethyldiphenyl-4,4'-diisocyanate, 200 g of N-methyl-2-pyrrolidone (hereinafter "NMP"), and 0.2 g of N,N-dimethylbenzylamine. The reactants were heated with stirring until a clear solution was formed. On heating at 130° to 132° C. for about 10 minutes, the solution liberated carbon dioxide gas and became viscous. Twenty minutes later, the solution became suddenly turbid, and polyimide particles separated out and precipitated in the form of slurry. The polymerization reaction was continued for 5 hours at the same temperature.

After the reaction, the reaction product was cooled and the polyimide particles were filtered out, followed by washing three times with NMP and then twice with acetone. The washed polyimide powder was dried by heating at 250° C. for three hours. In this manner, 37.2 g (95.3 wt% yield) of spherical porous polyimide powder were attained.

This polyimide powder was found to have an average particle diameter of 4.8 μm. The infrared absorption spectrum by the KBr method, gave absorption by the carbonyl of the imide group at 1720 cm$^{-1}$ and 1780 cm$^{-1}$.

This polyimide powder did not melt when heated to 500° C. and did not dissolve in a variety of solvents except NMP.

EXAMPLE 2

Into a 300-ml four-neck flask were charged 21.8 g (0.1 mole) of pyromellitic diannydride, 25.2 g (0.1 mole) of diphenylether diisocyanate, 200 g of NMP, and 0.2 g of N,N-dimethylbenzylamine. The reactants were heated with stirring until a clear solution was formed. On heating at 150° to 152° C. for about 5 minutes, the solution vigorously liberated carbon dioxide gas. Ten minutes later, the solution became suddenly turbid, and polyimide particles separated out and precipitated in the form of slurry. The polymerization reaction was continued for 4 hours at the same temperature.

After the same filtering, washing, and drying operations as in Example 1, 37.4 g (95.3 wt% yield) of spherical porous polyimide powder was obtained.

This polyimide powder was found to have an average particle diameter of 5.2 μm. The infrared absorption spectrum gave absorption by the carbonyl of the imide group. This polyimide powder was infusible and insoluble.

EXAMPLE 3

Into a 300 ml four-neck flask was charged, 29.4 g (0.1 mole) of 3,3',4,4'-biphenyltetracarboxylic acid dianhydride and 223 g of NMP. The reactants were stirred with heating at 130° C. until a uniform solution was formed. 26.4 g (0.1 mole) of 3,3'-dimethyldiphenyl-4,4'-diisocyanate was added, and then 0.2 g of N,N'-dimethyl-p-toluidine and 20 g of xylene were added. On stirring with heating at 130° C. for about 10 minutes, polyimide particles separated out and precipitated in the form of slurry. The polymerization reaction was continued for 5 hours at the same temperature.

After the same filtering, washing and drying operations as in Example 1, 46.0 g (97.0 wt% yield) of spherical porous polyimide powder were obtained.

Figure 4:
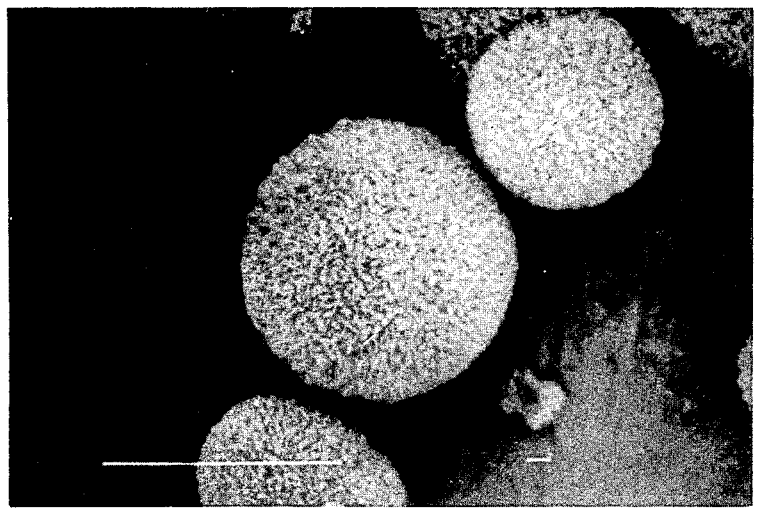
FIGS. 4 and 5 are electron micrographs of polyimide powder produced according to the process of the present invention.

This polyimide powder was found to have an average particle diameter of 4.5 μm. The infrared absorption spectrum gave absorption by the carbonyl of the imide group. This polyimide powder was infusible and insoluble. FIG. 1 shows an infrared spectrum and FIG. 4 is a scanning electron micrograph (5000 times) of this polyimide powder.

EXAMPLE 4

Into a 300-ml four-neck flask were charged 29.4 g (0.1 mole) of 3,3',4,4'-biphenyltetracarboxylic acid dianhydride and 218 g of N,N-dimethylformamide. The reactants were heated at 120° C. with stirring until a uniform solution was formed. 25.0 g (0.1 mole) of diphenylmethane-4,4'-diisocyanate and 0.2 g of N,N'-dimethyl-p-toluidine were added. The solution liberated carbon dioxide gas. After stirring for out and precipitated in the form of slurry. The polymerization reaction was continued for 5 hours at 120° to 122° C.

After the same filtering, washing, and drying operations as in Example 1, 45.2 g (98.7 wt% yield) of spherical porous polyimide powder were obtained.

Figure 2:
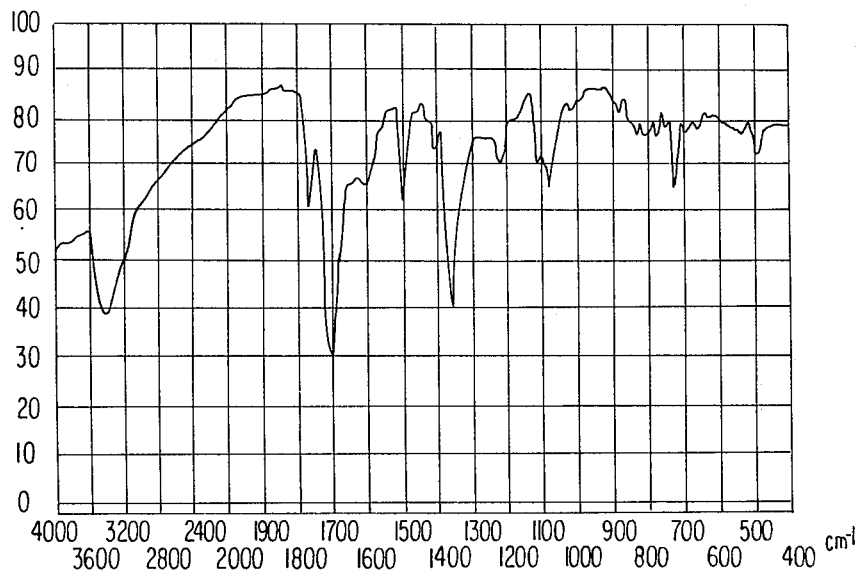

This polyimide powder was found to have an average particle diameter of 5.2 μm. The infrared absorption spectrum gave absorption by the carbonyl of the imide group. This polyimide powder was infusible and insoluble. FIG. 2 is an infrared spectrum of this polyimide powder.

EXAMPLE 5

Into a 300 ml four-neck flask were charged 32.2 g (0.1 mole) of 3,3',4,4'-benzophenonetetracarboxylic acid dianhydride of N,N-dimethylacetamido and 20 g of xylene and dissolved therein. To this solution were added 19.1 g (0.05 mole) of triphenylmethane-triisocyanate, 12.5 g (0.05 mole) of diphenylmethane-4,4'-diisocyanate, and 0.2 g of dimethylbenzylamine with stirring and heating at 140° C. On heating at 140° to 142° C. for 5 minutes, the solution vigorously liberated carbon dioxide gas, and polymide particles separated out and precipitated in the form of slurry. The polymerization reaction was continued for 5 hours at the same temperature.

After the same filtering, washing and drying operations as in Example 1, 53.8 g (92.5 wt % yield) of spherical porous polyimide powder were obtained.

This polymide powder was found to have an average particle diameter of 6.2 μm. The infrared absorption spectrum gave the absorption by the carbonyl of the imide group. This polymide powder was infusible and insoluble.

EXAMPLE 6

Into a 300 ml four-neck flask were charged 32.2 g (0.1 mole) of 3,3',4,4'-benzophenonetetracarboxylic acid dianhydride and 232 g of NMP and dissolved therein. To this solution were added 26.4 (0.1 mole) of 3,3'-dimethyldipheyl-4,4'-diisocyanate, 0.2 g of N,N'-dimethyl-p-toluidine, and 20 g of xylene with stirring and heating at 130° C. On heating at 130° C. for 10 minutes, the solution liberated carbon dioxide gas, and polyimide particles separated out and precipitated in the form of slurry. The polymerization reaction was continued for 5 hours at the same temperature.

After the same filtering, washing and drying operations as in Example 1, 45.0 g (90.4 wt % yield) of spherical porous polyimide powder were obtained.

Figure 3:
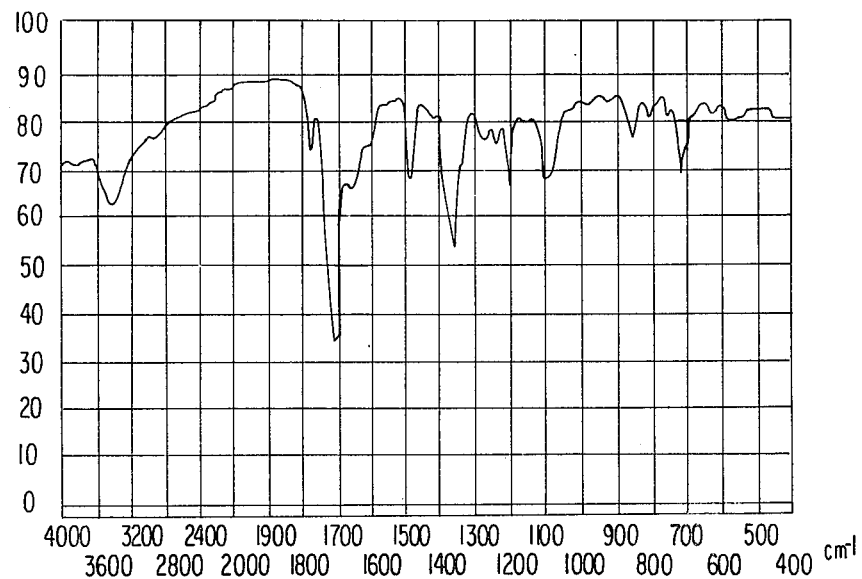
Figure 5:
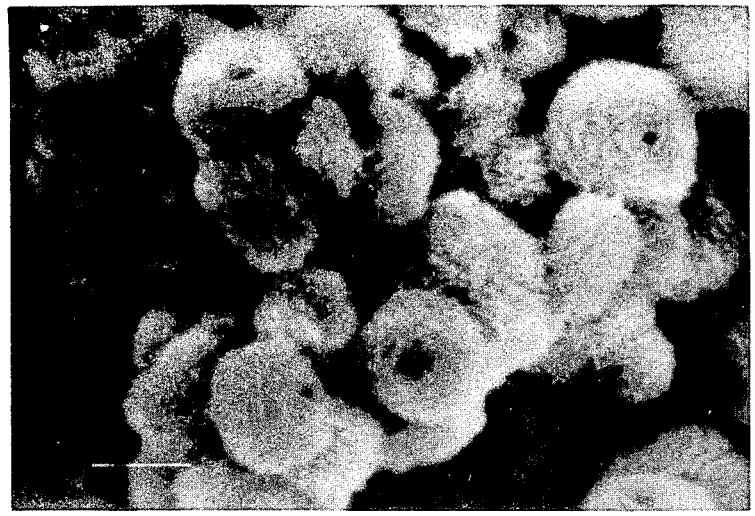

This polyimide powder was found to have an average particle diameter of 2.1 μm. The infrared absorption spectrum gave absorption by the carbonyl of the imide group. This polyimide powder was infusible and insoluble. FIG. 3 is an infrared absorption spectrum of this polyimide powder. FIG. 5 is a scanning type electron micrograph (20,000 times) of this polyimide powder.

COMPARATIVE EXAMPLE

Into a 300 ml four neck flask were charged 29.8 g (0.1 mole) of 3,3',4,4'-biphenyltetracarboxylic acid dianhydride and 223 g of NMP. The constituents were dissolved by stirring and heating at 120° C. to make a uniform solution. To this solution were added 26.4 g (0.1 mole) of 3,3'-dimethyldiphenyl-4,4'-diisocyanate and 0.2 g of N,N-dimethyl-p-toluidine. When heated with stirring at 80° C. for about 30 minutes, the solution became turbid and gradually turned into a paste. The polymerization reaction was continued for 1 hour at the same temperature. The reaction product became so thixotropic that it was difficult to perform stirring. The polymerization reaction was further continued for 1 hour and then the reaction product was heated at about 150° C. for 3 hours.

After the reaction, an attempt was made to separate the polyimide particles by filtration or centrifugation, but separation was impossible. The reaction product in the form of paste was placed in acetone and the resulting precipitate was filtered out. After crushing, the intended polyimide powder was obtained. However, the particles of the polyimide powder were not spherical nor porous as shown in the scanning type electron micrograph (1000 times) of FIG. 6.

Figure 6:
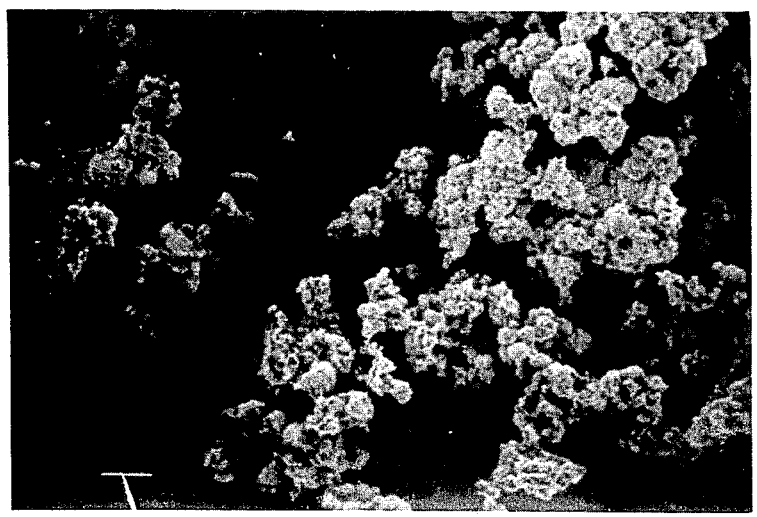
FIG. 6 is an electron micrograph of polyimide powder produced according to a previously known process.

The polyimide powder obtained in the above method form aggregates as shown in FIG. 6. That is, when the slurry containing the polymerization product is introduced into acetone, a polyimide of high molecular weight separates out together with low molecular weight polymers and unreacted products which are entrapped in the polyimide particles and are not easily removed in the subsequent washing step. In the subsequent heating and drying step, these impurities cause the blocking of the powder particles.

In contrast, in the process of the present invention, the polyimide particles are separated directly from the slurry and the low-molecular weight polymer remaining on the particles is removed in the washing step. Therefore, the powder particles do not aggregate and stay in the form of a porous sphere.

While the invention has been described in detail and with reference to specific embodiments thereof, it will be apparent to one skilled in the art that various changes and modifications can be made therein without departing from the spirit and scope thereof.

We claim:

1. A process for producing spherical porous polyimide powder comprising:
   (a) polymerizing at least one aromatic tetracarxylic acid dianhydride which forms an infusible insoluble polyimide and an approximately the same quantity of at least one aromatic polyisocyanate in an organic solvent at a temperature of 100° to 200° C. and in the presence of a tertiary amine catalyst to form said polyimide particles in the form of slurry;

(b) filtering or centrifuging said polyimide particles; and (c) washing the resulting polyimide particles with an organic solvent, wherein the resulting spherical porous polyimide powder has an average particle diameter of 1 to 20 μm.

2. The process of claim 1, wherein the aromatic tetracarboxylic acid dianhydride is at least one member selected from the group consisting of pyromellitic acid dianhydride, 3,3',4,4'-benzophenonetetracarboxylic acid dianhydride, 3,3',4,4'-biphenyltetracarboxylic acid dianhydride and 2,3,3',4'-biphenyltetracarboxylic acid dianhydride.

3. The process of claim 1, wherein the aromatic polyisocyanate is at least one member selected from the group consisting of diphenylmethane-4,4'-diisocyanate, 3,3'-dimethyldiphenyl-4,4'-diisocyanate, naphthalene-2,6-diisocyanate, p-phenylene diisocyanate, m-phenylene diisocyanate, diphenylether-4,4'-diisocyanate and a polyisocyanate containing an isocyanurate ring.

4. The process of claim 1, wherein the aromatic tetracarboxylic acid dianhydride is selected from the group consisting of pyromellitic acid dianhydride, 3,3',4,4'-benzophenonetetracarboxylic acid dianhydride, and 3,3',4,4'-biphenyltetracarboxylic acid dianhydride, and the aromatic polyisocyanate is selected from the group consisting of diphenylmethane-4,4'-diisocyanate, 3,3'-dimethyldiphenyl-4,4'-diisocyanate, and diphenylether-4,4'-diisocyanate.

5. The process of claim 1, wherein the organic solvent is selected from the group consisting of N-methyl-2-pyrrolidone, N,N-dimethylacetamide, N,N-dimethylformamide, dimethylsulfoxide, hexamethylphosphortriamide, N,N'-dimethyl-2-imidazolidinone, cresol, phenol, and xylenol.

6. The process of claim 1, wherein the tertiary amine catalyst is selected from the group consisting of triethylamine, tri-n-butylamine, 1,8-diazabicyclo-(5,4,0)-undecene-7 and a complex thereof, dimethylbutylamine, N,N-dimethyl-p-toluidine, N,N-dimethylaniline and N,N-dimethylbenzylamine.

7. The process of claim 1, wherein the tertiary amine catalyst is employed in an amount of from 0.05 to 10 mol% per 1 mole of aromatic tetracarboxylic acid dianhydride.

8. The process of claim 1, wherein the reaction temperature is 110° to 180° C.

* * * * *